(12) United States Patent
Hear

(10) Patent No.: US 6,868,866 B2
(45) Date of Patent: Mar. 22, 2005

(54) COMPRESSED AIR DISTRIBUTING APPARATUS FOR COMPRESSED AIR SYSTEMS OF MOTOR VEHICLES

(75) Inventor: Siegfried Hear, Wiesloch (DE)

(73) Assignee: Haldex Brake Products GmbH (DE)

( * ) Notice: Subject to any disclaimer, the term of this patent is extended or adjusted under 35 U.S.C. 154(b) by 144 days.

(21) Appl. No.: 10/434,538

(22) Filed: May 9, 2003

(65) Prior Publication Data

US 2003/0209276 A1 Nov. 13, 2003

(30) Foreign Application Priority Data

May 10, 2002 (DE) .......................... 102 20 791

(51) Int. Cl.[7] .............................. F16K 11/10
(52) U.S. Cl. ............................. 137/883; 137/885
(58) Field of Search .............................. 137/883, 885

(56) References Cited

U.S. PATENT DOCUMENTS

| | | | | |
|---|---|---|---|---|
| 5,678,900 | A | | 10/1997 | Blanz ..................... 303/6.01 |
| 6,041,808 | A | * | 3/2000 | Blanz ..................... 137/118.06 |
| 6,340,034 | B1 | * | 1/2002 | Arnott et al. ............... 137/883 |
| 6,540,308 | B1 | | 4/2003 | Hilberer .................. 303/6.01 |

FOREIGN PATENT DOCUMENTS

| | | |
|---|---|---|
| DE | 36 03 742 A1 | 8/1986 |
| DE | 44 21 575 C2 | 1/1996 |
| DE | 195 15 895 A1 | 10/1996 |
| DE | 195 44 621 C1 | 1/1997 |
| DE | 197 00 243 C1 | 4/1998 |
| DE | 197 10 814 C1 | 7/1998 |
| DE | 198 54 205 A1 | 5/2000 |
| EP | 0 689 117 B1 | 8/1998 |
| EP | 0 776 807 B1 | 5/2001 |

* cited by examiner

Primary Examiner—John Fox
(74) Attorney, Agent, or Firm—Thomas, Kayden, Horstemeyer & Risley, LLP

(57) ABSTRACT

A compressed air distributing apparatus for compressed air systems of motor vehicles includes a multi circuit protection valve (9) for supplying a plurality of circuits (I, II, III, IV, V) with compressed air. The multi circuit protection valve (9) includes a first solenoid valve (36) and a second solenoid valve (37). Each of the solenoid valves (36, 37) includes a deaerating connection leading to the atmosphere. A plurality of overflow valves (18) includes a valve body (20), a flow chamber (23), a rear chamber (34), a first effective surface (22), a second effective surface (27) and a spring (31) being located in the rear chamber (34). The valve body (20) separates the flow chamber (23) from the rear chamber (34). Each of the overflow valves (18) is associated with one of the circuits (I, II, III, IV, or V), and its opening pressure is greater than its closing pressure to allow for limited backflow. At least one of the overflow valves (18) includes a third effective surface (33) and a fourth effective surface (35). The third effective surface (33) is controlled by the first solenoid valve (36). The fourth effective surface (35) is controlled by the second solenoid valve (37). The first solenoid valve (36) opens the overflow valve (18). The second solenoid valve (37) closes the overflow valve (18).

20 Claims, 5 Drawing Sheets

COMPRESSED AIR DISTRIBUTING APPARATUS FOR COMPRESSED AIR SYSTEMS OF MOTOR VEHICLES

CROSS REFERENCE TO RELATED APPLICATIONS

This application claims priority to co-pending German Patent Application No. 102 20 791.7 entitled "Druckluftverteilungseinrichtung für Kfz-Druckluftanlagen", filed May 10, 2002.

FIELD OF THE INVENTION

The present invention generally relates to a compressed air distributing apparatus for compressed air systems of motor vehicles. Such compressed air distributing apparatuses at least include one multi circuit protection valve. However, the apparatus may also be designed as a compressed air control apparatus also including a pressure controller and an air dryer in addition to the multi circuit protection valve. Depending on the embodiment of the apparatus, these elements are combined to form one common structural unit. Such a common structural unit may be designed as a compressed air control apparatus being located downstream of a compressor of a compressed air supply apparatus of the vehicle.

BACKGROUND OF THE INVENTION

A compressed air distributing apparatus being designed as a compressed air control apparatus is known from German Patent No. DE 195 44 621 C1 corresponding to European Patent No. EP 0 776 807 B1. A pressure controller and an air dryer including respective elements are located in a common housing. The common housing may also be designed to be divided. The known compressed air control apparatus includes a multi circuit protection valve being designed and arranged to serve for a plurality of circuits being connected to the housing. Each circuit includes an overflow valve having limited backflow. For this purpose, each overflow valve includes a valve body or a so called "movable wall" being supported on a spring at one side. An effective surface is located at the other side. The effective surface is subjected or impinged by compressed air in a flow chamber being located at the upstream side. The flow chamber is permanently connected to a central bore serving for distribution of the compressed air arriving from the compressor. The valve body of the overflow valve includes two effective surfaces facing the upstream side, namely the aforementioned first effective surface and a second effective surface. The second effective surface is active in the opened position, and it is subjected with compressed air in the opened position, respectively. The valve body is supported on a spring being surrounded by a spring chamber. A bypass conduit is located between the flow chamber and the spring chamber. A solenoid valve including its own deaerating connection is located in the bypass conduit. The solenoid valve is closed in its currentless condition such that the spring chamber of the overflow valve is connected to the atmosphere. When the solenoid valve is actively controlled, it switches to reach its other position. This means that the deaerating connection is locked and the spring chamber is connected to the flow chamber such that there is an additional force (or auxiliary force) in addition to the force supplied by the spring. The auxiliary force tends to close the overflow valve and to keep the overflow valve closed, respectively. In this way, the overflow valve fulfills a plurality of functions. When the rear chamber is connected to the atmosphere, it functions in the common way, meaning it provides the advantageous functions of an overflow valve having limited backflow. When the rear chamber is supplied with the same pressure as the control chamber at the other side of the valve body, the force of the spring in the rear chamber closes the overflow valve. This means that it also fulfills the function of the locking valve. In this way, it is possible to lock the respective circuit, especially in case of a failure. This has a positive effect on the other unlocked circuits, meaning emergency operation may also be maintained for these circuits during a failure. Furthermore, the multi circuit protection valve and the respective overflow valve may also be used for the purpose of limiting the pressure. It is a drawback that the known overflow valve having limited backflow cannot be opened before having reached the opening pressure. Another essential drawback of the known compressed air control apparatus is the fact that there is increased pressure in this circuit having limited pressure during failure of the electrical supply or when ignition of the vehicle is turned off when using different pressures in the circuits and using an overflow valve as the pressure limiting device. This increased pressure is forbidden by law. Another drawback is that the known overflow valve having limited backflow cannot be opened below its opening pressure in an arbitrary way, meaning when it is desired to realize a special function.

Another similar compressed air control apparatus is known from German Patent No. DE 197 00 243 C1. The effective surface to be directly subjected by the solenoid valve is located at the side of the valve body facing away from the flow chamber and, thus, at the side of the spring. A special pressure limiting valve is used for the circuits. The pressure limiting valve is arranged downstream of the respective overflow valve of the respective circuit. In this case, the overflow valve is only used to fulfill its normal pneumatic function. The pressure limiting valve may be additionally influenced by the solenoid valve. However, it is not possible to open the overflow valve below the predetermined opening pressure in an arbitrary way, meaning when it is desired. The actuation of the solenoid valve results in the pressure limiting function of the pressure limiting device being turned off.

Another compressed air control apparatus is known from German Patent No. DE 44 21 575 C2 corresponding to European Patent No. EP 0 689 117 B1. The known apparatus includes a pressure controller, an air dryer and a multi circuit protection valve. The circuits are protected by check valves being pushed open by an actuation piston to be switched by a solenoid valve. The circuits may also be protected by an overflow valve including limited backflow. A solenoid valve is associated with each of the overflow valves of each circuit. The solenoid valve in its non-excited condition is opened, meaning the spring chamber of the overflow valve is connected to the flow chamber. In this way, the overflow valve has a comparatively increased opening pressure. In the excited position, the solenoid valve switches, and it deaerates the spring chamber. The effective surface to be impinged by the solenoid valve is located at the side of the valve body facing away from the flow chamber, meaning in the spring chamber. This results in the insofar increased effective surface of the spring chamber having the effect of the overflow valve not opening during filling. This is only possible when the solenoid valve switches to reach the position in which the spring chamber is connected to the atmosphere. In this way, there is the drawback of supply of the circuits not being possible during a failure of the electric supply. On the other hand, when the electric supply works correctly, it is not possible to open the overflow valve of a circuit before having reached the predetermined opening pressure of the overflow valve.

A compressed air control apparatus including a pressure controller, an air dryer and an integrated multi circuit protection valve is known from German Patent Application No. DE 195 15 895 A1. A check valve is located downstream of the air dryer in the filling conduit. The central aerating chamber begins at the check valve, the overflow valves of the circuits being supplied with compressed air by the central aerating chamber. The overflow valves having limited backflow include effective surfaces being located to face the upstream side. Each overflow valve includes a valve body or a so called "movable wall" being supported on a spring. An actuation member is located at this side of the spring chamber, the actuation member being subjected with pressure or deaerated by a pre-control valve. Supply of the pre-control valves with compressed air is not realized by the common flow chamber of the overflow valves starting after the check valve, but rather upstream of the check valve such that there is no control air in this conduit during the idle phase. The pre-control valves may also be supplied with compressed air by a second supply conduit, the compressed air coming from the circuit I. When the circuit I fails—for example when there is leakage—the pre-control valves are not supplied with compressed air in the idle phase. Consequently, arbitrary closing of the overflow valves is not possible. Arbitrary opening of the overflow valves of the circuits below the opening pressure of the overflow valves is also not possible.

SUMMARY OF THE INVENTION

The present invention relates to a compressed air distributing apparatus for compressed air systems of motor vehicles. The compressed air distributing apparatus includes a multi circuit protection valve being designed and arranged to supply a plurality of circuits with compressed air. The multi circuit protection valve includes a first solenoid valve and a second solenoid valve. Each of the solenoid valves includes a deaerating connection leading to the atmosphere. A plurality of overflow valves includes a valve body, a flow chamber, a rear chamber, a first effective surface, a second effective surface and a spring being located in the rear chamber. The valve body is designed and arranged to separate the flow chamber from the rear chamber. Each of the overflow valves is associated with one of the circuits, and it is designed and arranged in a way that the opening pressure is greater than the closing pressure to allow for limited backflow. At least one of the overflow valves includes a third effective surface and a fourth effective surface. The third effective surface is designed and arranged to be controlled by the first solenoid valve. The fourth effective surface is designed and arranged to be controlled by the second solenoid valve. The first solenoid valve is designed and arranged to open the overflow valve. The second solenoid valve is designed and arranged to close the overflow valve.

The present invention also relates to a multi circuit protection valve and to a compressed air control apparatus further including a pressure controller being designed and arranged to control the pressure in the compressed air control apparatus and an air dryer being designed and arranged to dry the compressed air flowing through the compressed air control apparatus.

The novel compressed air distributing apparatus is designed in a way that the overflow valve of at least one circuit may be arbitrarily opened and closed, meaning it may be opened and closed when it is desired. Usually, it is desired to control a plurality of overflow valves in this way. This arrangement has the positive effect of reducing the number of solenoid valves serving to control the overflow valves.

The present invention is based on the concept of increasing the possibilities of opening and closing the overflow valves of at least some of the circuits. Opening an overflow valve means to open it below the opening pressure of a usual overflow valve in the desired way. Opening is even possible when the respective overflow valve has been arbitrarily closed. Additionally, but not simultaneously, it is possible to close the respective overflow valve when desired when the overflow valve is located in its closed position. This closing effect may be used to protect the respective circuit and also to fill the other circuits of the other multi circuit protection valve in a preferred way. The valve body or so called "movable wall" of this overflow valve of a circuit or of a plurality of overflow valves of a plurality of circuits includes a total number of four effective surfaces, meaning the first effective surface being located at the flow side and determining the opening pressure of the overflow valve, and the second effective surface being designed and arranged to remain in the opened position after having reached the opening pressure when being subjected with pressure. The third and/or the fourth effective surface being located at the valve body of the overflow valve may be located at the flow side (or the upstream side in other words) or at the downstream side. The third effective surface being located at the valve body of the overflow valve may be the effective surface serving to arbitrarily open the overflow valve. The fourth effective surface may be the effective surface serving to arbitrarily close the respective overflow valve. However, the third effective surface may also have the above described function of the fourth effective surface, and the fourth effective surface may have the above described function of the third effective surface. Two separate solenoid valves serve to control the third and the fourth effective surface, one of the solenoid valves serving to open the overflow valve and the other solenoid valve serving to close the overflow valve. There are different combinations how to design and arrange these two solenoid valves. For example, it is possible that the solenoid valve being associated with the third effective surface and the solenoid valve being associated with the fourth effective surface are designed and arranged such that these two solenoid valves are closed in their currentless position. This means that the bypass conduit leading to the third effective surface and being connected to the central aerating system is locked, while the effective chamber of the third effective surface is simultaneously connected to the atmosphere. When these solenoid valves are then supplied with current, meaning when they reach the excited condition, they switch such that the connection is connected to the atmosphere and the effective chamber of the third effective surface is subjected with compressed air. These solenoid valves may be designated as directly operating solenoid valves. However, it is also possible to use solenoid valves being opened in the currentless position as the solenoid valves being associated with the third and the fourth effective surface. This means that they lock the deaerating connection and ensure the connection in the bypass conduit to the third effective surface and to the fourth effective surface, respectively. These solenoid valves may then be designated as indirectly operating solenoid valves. Finally, it is also possible to use solenoid valves in a mixed arrangement, meaning to use solenoid valves being opened in the currentless position and solenoid valves being closed in the currentless position at the same time.

There are a number of different possibilities of arranging the third and the fourth effective surface at the valve body of the overflow valve. The third effective surface may be located at the first side of the valve body of the overflow valve, and the fourth effective surface may be located at the opposite second side of the valve body of the overflow valve. In combination therewith, it is preferred to chose the solenoid valves being associated with the third and the fourth effective surface such that they all are either closed or opened in the currentless position.

However, there also is the possibility of arranging the third effective surface and the fourth effective surface at the same side of the valve body of the overflow valve. In this case, it is preferred that one of the solenoid valves is designed in a way that it is closed in the currentless position and the other solenoid valve is designed in a way that it is opened in the currentless position.

Furthermore, it is preferred when the two solenoid valves being associated with an overflow valve are not only associated with this one overflow valve of one circuit, but rather with a plurality of overflow valves of a plurality of circuits such that common switching of the overflow valves of a plurality of circuits may be realized. It is especially preferred to be capable of opening the two brake circuits simultaneously, meaning to commonly open the overflow valves of the two brake circuits I and II. In combination therewith, these two brake circuits may also be commonly closed. It may also make sense to commonly close all four circuits I to IV. In this way, for example, a fifth circuit being connected to the air suspension system may be filled quickly to supply a sufficient amount of compressed air within a short period of time to realize a lifting movement of the vehicle when the vehicle is loaded.

Preferably, the valve body is designed as a step piston at which the third and the fourth effective surfaces are arranged. Alternatively, the valve body may also be designed as a membrane piston.

The two solenoid valves being associated with the third and the fourth effective surface of one or more overflow valves of one or more circuits do not necessarily have to be the only solenoid valves of the respective multi circuit protection valve. It is also possible to arrange an additional solenoid valve in one or more circuits, the additional solenoid valve exclusively serving to open the respective overflow valve. Such an arrangement is especially preferred in the circuit III supplying the brake system of the trailer.

A pressure limiting device may be located downstream of an overflow valve of a circuit. The overflow valve may be the one only including two effective surfaces or the one including a total number of three or of four effective surfaces.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
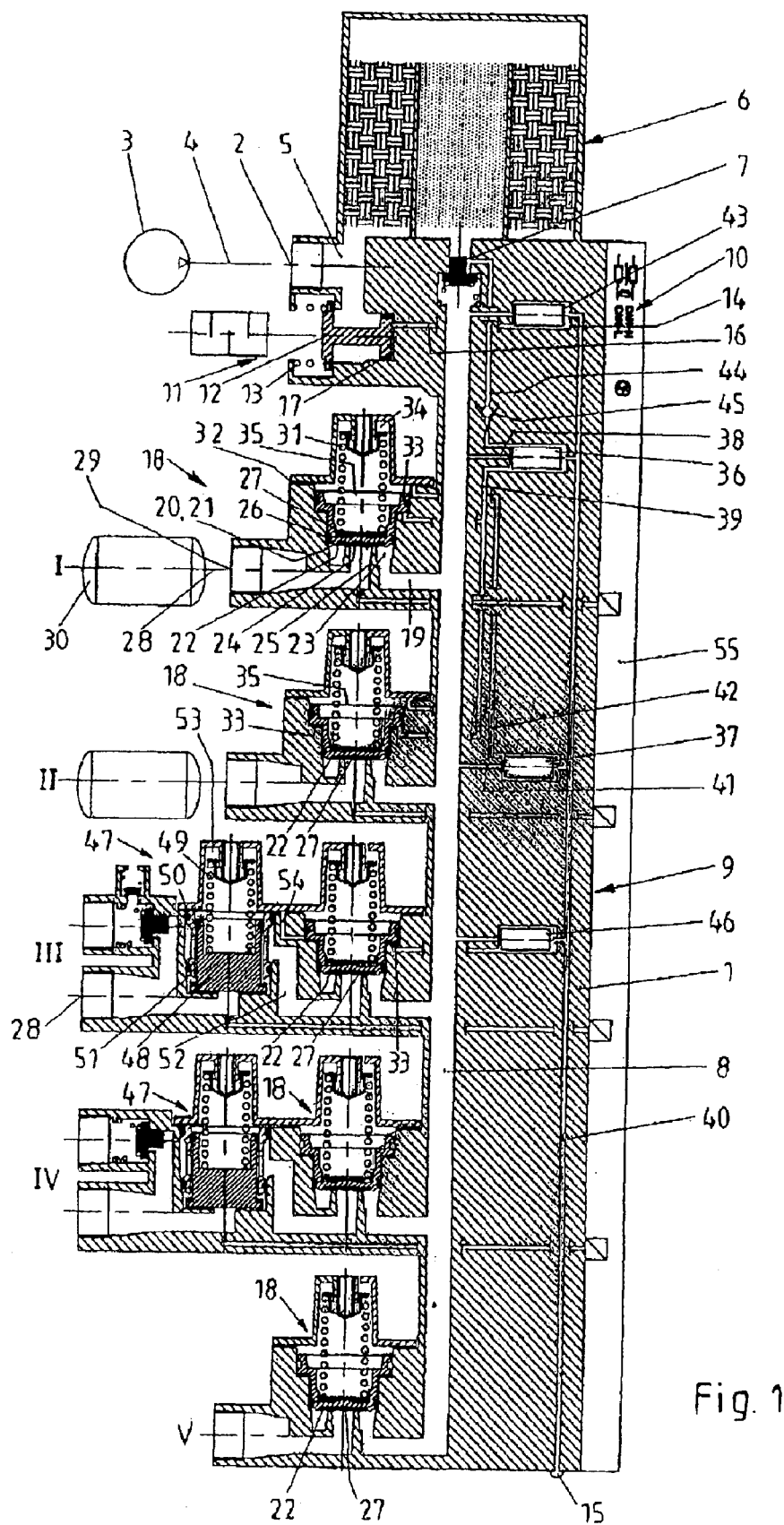
FIG. 1 is a schematic sectional view of the novel compressed air control apparatus.

Referring now in greater detail to the drawings, FIG. 1 illustrates a novel compressed air distributing apparatus and a compressed air control apparatus, respectively, for compressed air systems of motor vehicles. Especially, the motor vehicles are trucks. The illustrated compressed air control apparatus includes a common housing 1. Most of the components of the compressed air control apparatus are located in the housing 1 and they are connected to the housing 1, respectively. The housing 1 includes a connection 2 to which a connection conduit 4 coming from a compressor 3 is connected. The connection 2 leads to a distributing chamber 5 from which the compressed air streams through an air dryer 6 to reach a check valve 7. When the check valve 7 is pushed open, the compressed air reaches a central bore 8 to which a plurality of circuits are connected. In this way, the function of an integrated multi circuit protection valve 9 serving to supply a plurality of circuits with compressed air is realized. A pressure controller 10 is located in the housing 1. In this case, the pressure controller 10 is designed as an electrical pressure controller 10. The pressure controller 10 includes an outlet valve 11 including a piston 12 and a closing spring 13. The piston 12 is supported on the closing spring 13. A solenoid valve 14 is associated with the outlet valve 11. The solenoid valve 14 is supplied with compressed air from the central bore 8. It includes its own deaerating (or ventilating) connection 15 leading to the atmosphere. Compressed air may reach an actuating piston 17 via the solenoid valve 14 and a conduit 16 to open the outlet valve 11.

A compressed air control apparatus is to be understood as a compressed air distributing apparatus further including a pressure controller 10 and an air dryer 6. However, these elements 10 and 6 do not necessarily have to be located in one common housing 1. It is possible that the multi circuit protection valve 9 is located in the housing 1, and the air dryer 6 and the pressure controller 10 are located outside of the housing 1.

The compressed air control apparatus includes circuits I, II, III, IV and V. Each circuit I, II, III, IV and V includes an overflow valve 18. The overflow valve 18 has limited backflow. This means that the opening pressure is greater than the closing pressure of the overflow valve 18. The overflow valve 18 it is connected to the central bore 8 by a conduit 19 to be supplied with compressed air. The overflow valve 18 includes a valve body 20 (a so called "movable wall"). In the illustrated exemplary embodiment, the valve body 20 is designed as a step piston 21. The valve body 20 and the step piston 21, respectively, includes a first effective surface 22 being located at the upstream side. A flow chamber 23 is located close to the effective surface 22, the flow chamber 23 being permanently connected to the central bore 8 by the conduit 19. The valve body 20 and the step piston 21, respectively, surface includes a sealing plate 24 being located at its front. The sealing plate 24 and a rim 25 are designed and arranged to cooperate to form a passage valve 24, 25. The step piston 21 includes a seal 26 being designed and arranged to limit the effective surface 22 being located between the seal 26 and the rim 25 in the form of an (outer) annulus.

The step piston 21 includes a second effective surface 27 being designed as an (inner) circular surface being surrounded by the rim 25. The second effective surface 27 is permanently subjected with pressure from the downstream side. This means that a conduit 28 leads from the effective surface 27 to a reservoir container 30 via a conduit 29. The reservoir container 30 is associated with the circuit I. The rear side of the step piston 21 facing away from the flow chamber 23 is supported on a spring 31. The spring 31 is supported at the housing 1, and it may be designed to be adjustable by a spring plate including adjustment screws, for example. The opening pressure of the overflow valve 18—meaning the pressure at which the passage valve 24, 25 opens—is determined by the force of the spring 31 in combination with the size of the first effective surface 22.

The step piston 21 and the movable wall 20, respectively, includes another seal 32 being located at a stepped portion having an increased diameter. A third effective surface 33 is located between the seals 26 and 32. This third effective surface 33 is located at the side of the step piston facing the flow chamber 23. The spring 31 is located in a rear chamber 34. A fourth effective surface 35 is located at the step piston 21 and at the movable wall, respectively, next to the rear chamber 34. For reasons of clarification, the four effective surfaces 22, 27, 33, 35 are also illustrated at the overflow valve 18 of the circuit II.

Two solenoid valves 36 and 37 are associated with the two overflow valves 18 of the circuits I and II. It is to be understood that they may also be associated only with the overflow valve 18 of the circuit I. The solenoid valve 36 is associated with the third effective surface 33. The solenoid valve 37 is associated with the fourth effective surface 35. The solenoid valve 36 serves to arbitrarily open the overflow valve 18, in this case the two overflow valves 18 of the circuits I and II. A supply conduit 38 leads from the central bore 8 to the solenoid valve 36. The solenoid valve 36 has a design such that it is closed in its currentless condition, as this is illustrated in FIG. 1. This means that the supply line 38 is locked, while conduits 39 leading to the third effective surfaces 33 are simultaneously connected to the atmosphere by a common deaerating conduit 40. It may be seen in the Figure that the solenoid valve 36 switches to reach its other position during excitation. This means that the deaerating connection of the third effective surface 33 is locked, and this third effective surface 33 of the two overflow valves 18 of the circuits I and II is simultaneously subjected with compressed air from the central bore 8. Due to this impingement of the third effective surface 33, the step piston 21 and the valve body 20, respectively, of the overflow valve 18 is impinged by an additional force being active in the opening direction of the overflow valve 18. This force may be realized at any time by controlling the solenoid valve 36.

Similar conditions apply to the solenoid valve 37. The solenoid valve 37 is supplied with compressed air by the central bore 8 and via a supply conduit 41 starting downstream of the check valve 7. Conduits 42 lead from the solenoid valve 37 to the fourth effective surface 35 being located at the two overflow valves of the circuits I and II. The fourth effective surface 35 is located at the downstream side, meaning in the region of the rear chamber 34. Thus, it is located on the other side of the movable wall 20 compared to the third effective surface 33. The solenoid valve 37 serves to arbitrarily close the overflow valves of the circuits I and II. This means that the overflow valves may be closed when it is desired. FIG. 1 illustrates a combination in which the third and the fourth effective surfaces 33, 35 are located at different sides of the movable wall 20 of the overflow valves 18. In combination therewith, two solenoid valves 36, 37 are used, both being closed in the currentless condition such that the supply conduits 38 and 41 are locked.

The pressure controller 10 includes its own solenoid valve 43. The solenoid valve 43 is to be understood as a separate solenoid valve in addition to the solenoid valves 36 and 37.

The solenoid valve 36 serving to arbitrarily open the overflow valves 18 of the circuits I and II when it is desired, also fulfills the function of controlling regeneration by a regeneration conduit 44 in which a check valve 45 is located. It is to be understood that this is an additional function of the solenoid valve 36 which does not necessarily have to be included in the solenoid valve 36, which is not necessarily required and which may be realized in a different way.

The circuit III also includes an overflow valve 18 having limited backflow. The overflow valve 178 includes the two effective surfaces 22 and 27 and the third effective surface 33, but not the fourth effective surface 35. Another solenoid valve 46 is associated with the overflow valve 18 of the circuit III. The solenoid valve 46 is arranged in addition to and independent from the solenoid valves 36 and 37. The solenoid valve 46 serves to open the overflow valve 18 of the circuit III when desired. Opening the overflow valve 18 of circuit III is independent from opening of the overflow valves 18 of the circuits I and II by the solenoid valve 36. A pressure limiting device 47 may be arranged downstream of the overflow valve 18 of the circuit III. The pressure limiting device 47 includes a piston 48 being supported on a limiting spring 49. The force of the limiting spring 49 may be designed to be adjustable. The piston 48 of the pressure limiting device 47 is surrounded by an insert 50 being fixedly connected to the housing 1. The insert 50 is arranged in a sealed way, as this is illustrated in FIG. 1. The piston 48 together with a rim 51 of the insert body 50 forms a passage valve for compressed air coming from the overflow valve 18 via a conduit 52. A conduit 28 leads from the pressure limiting device 47 to the respective reservoir container 30 of the respective circuit (not illustrated). The limiting spring 49 is located in an actuation chamber 53. The actuation chamber 53 is connected to the effective chamber of the third effective surface 33 of the respective overflow valve 18 via a connecting conduit 54 such that a switching movement of the solenoid valve 46 also affects the pressure limiting device 47 being arranged downstream.

The circuit IV has a similar design as the circuit III. It includes an overflow valve 18 and a pressure limiting device 47 being arranged downstream.

The circuit V includes an overflow valve 18 having limited backflow and a usual design. There only are the two effective surfaces 22 and 27. The air-suspension system of the vehicle may be connected to the circuit V.

FIG. 1 illustrates an embodiment of the novel compressed air control apparatus in which all solenoid valves 36, 37, 43, 46 are designed such that they are closed in the currentless condition. This especially applies to the solenoid valve 36 for opening the overflow valves 18 of the circuits I and II and the solenoid valve 37 for closing the overflow valves 18 of the circuits I and II. The third effective surface 33 and the fourth effective surface 35 are located at different sides of the movable wall 20.

The novel compressed air distributing apparatus according to FIG. 1 operates as follows: as soon as the compressor 3 has been actuated, compressed air reaches the central bore 8 via the check valve 7 in the "load phase" being adjusted by the pressure controller 10. The overflow valves 18 of the different circuits are adjusted to have a certain opening pressure. As soon as this opening pressure has been reached at the first effective surface 22, the respective overflow valve 18 opens, and compressed air reaches the respective reservoir container 30. As soon as the second effective surface 27 is impinged with this pressure, the overflow valve 18 remains in the opened position.

When preferred filling of the circuits I and II is to be realized, the solenoid valve 36 is switched to reach the excited position before the normal opening pressure of the overflow valve 18 of the circuits I and II has been reached. Due to the additional force acting upon the third effective surface 33, the overflow valves 18 of the circuits I and II open even before having reached the opening pressure such that the reservoir containers 30 of the circuits I and II are filled in a preferred way, while the circuits III to V are not yet filled. The reservoir containers 30 of the circuits III to V are filled with compressed air when the opening pressures of the overflow valves 18 of these circuits III to V have been exceeded. At this point in time, the solenoid valve 36 may be switched since all overflow valves 18 are located in the opened position. Pressure sensors may serve to sense the respective pressure and the signal representing the sensed pressure may be transmitted to a central control unit 55 also controlling the solenoid valves 36 and 37. The pressure sensors sense the downstream pressure, meaning the pressure in the respective reservoir containers 30.

However, when preferred filling of the circuits III to V is desired, the solenoid valve 37 is controlled and excited by the control unit 55. As a result, the fourth effective surface 35 is subjected with compressed air, and the overflow valves 18 of the circuits I and II are still held in their closed position since they are located in the closed position, anyway. Due to the fact that the circuits III and IV often include reservoir containers 30 having a comparatively small volume which may be filled comparatively quickly, closing of the overflow valves 18 of the circuits I and II results in the circuit V being filled in a preferred way. This has a positive effect on an air suspension system being connected to circuit V, for example for allowing loading of the vehicle within a short period of time.

The solenoid valve 46 of the circuit III may be actuated by the control unit 55 independent from or in combination with the solenoid valves 36 and 37.

Arbitrarily opening (meaning when it is desired) of the solenoid valves 18 of the circuits I and II by the solenoid valve 36 and arbitrarily closing by the solenoid valve 37 may not only be used for preferred filling, but also in other situations. For example, this may be used when there is leakage in one of the two braking circuits I or II. Then, it may be necessary to allow for desired air exchange between the circuits, meaning to respectively switch the solenoid valves 36 and 37 by the control unit 55 for a short period of time or even for a longer period of time.

Figure 2:
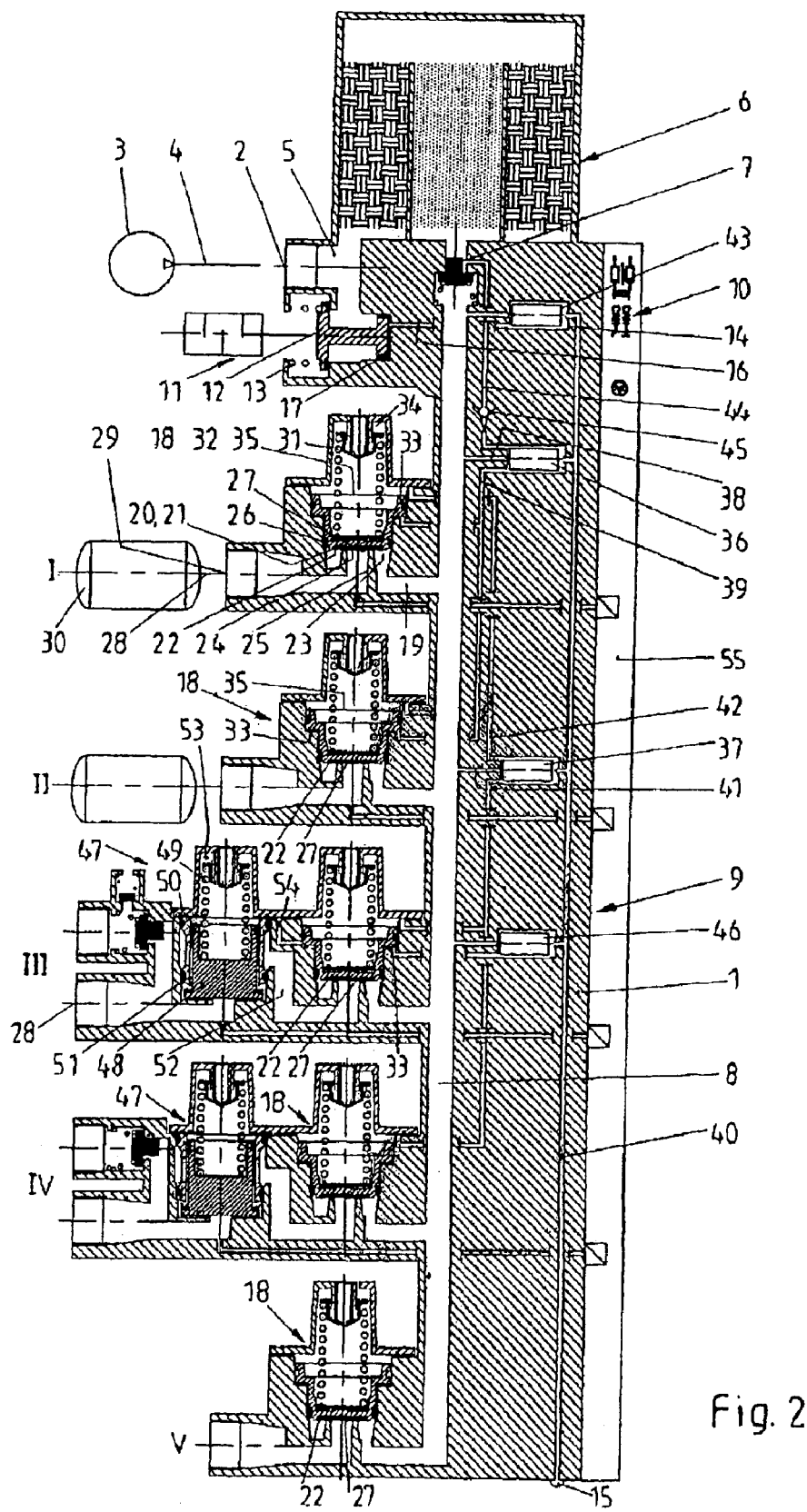
FIG. 2 is a schematic sectional view of a second exemplary embodiment of the novel compressed air control apparatus.

FIG. 2 illustrates another exemplary embodiment of the novel compressed air distributing apparatus having a lot in common with the embodiment illustrated in FIG. 1. Consequently, it is referred to the above description with respect to the arrangement and functionality of the apparatus as illustrated in FIG. 1.

The solenoid valve 36 is designed and arranged to open the overflow valves 18 of the two circuits I and II. The solenoid valve 37 does not only affect the circuits I and II, but also the circuits III and IV. The third effective surface 33 and the fourth effective surface 33 and the fourth effective surface 35 are located at different sides of the movable wall 20, as this is also the case in the exemplary embodiment of FIG. 1. All solenoid valves, especially the solenoid valves 36 and 37 are designed in a way that they are closed in their currentless condition, as this is illustrated in FIG. 2.

The functionality of the compressed air control system according to FIG. 2 allows for very quick preferred filling of the circuit V of the air suspension. This is achieved by controlling the solenoid valve 37 to reach its excited condition. In this way, the overflow valves 18 of the circuits I to IV are maintained in their closed position until preferred filling of the circuit V has been completed. Afterwards, there are the switching possibilities as described above.

Figure 3:
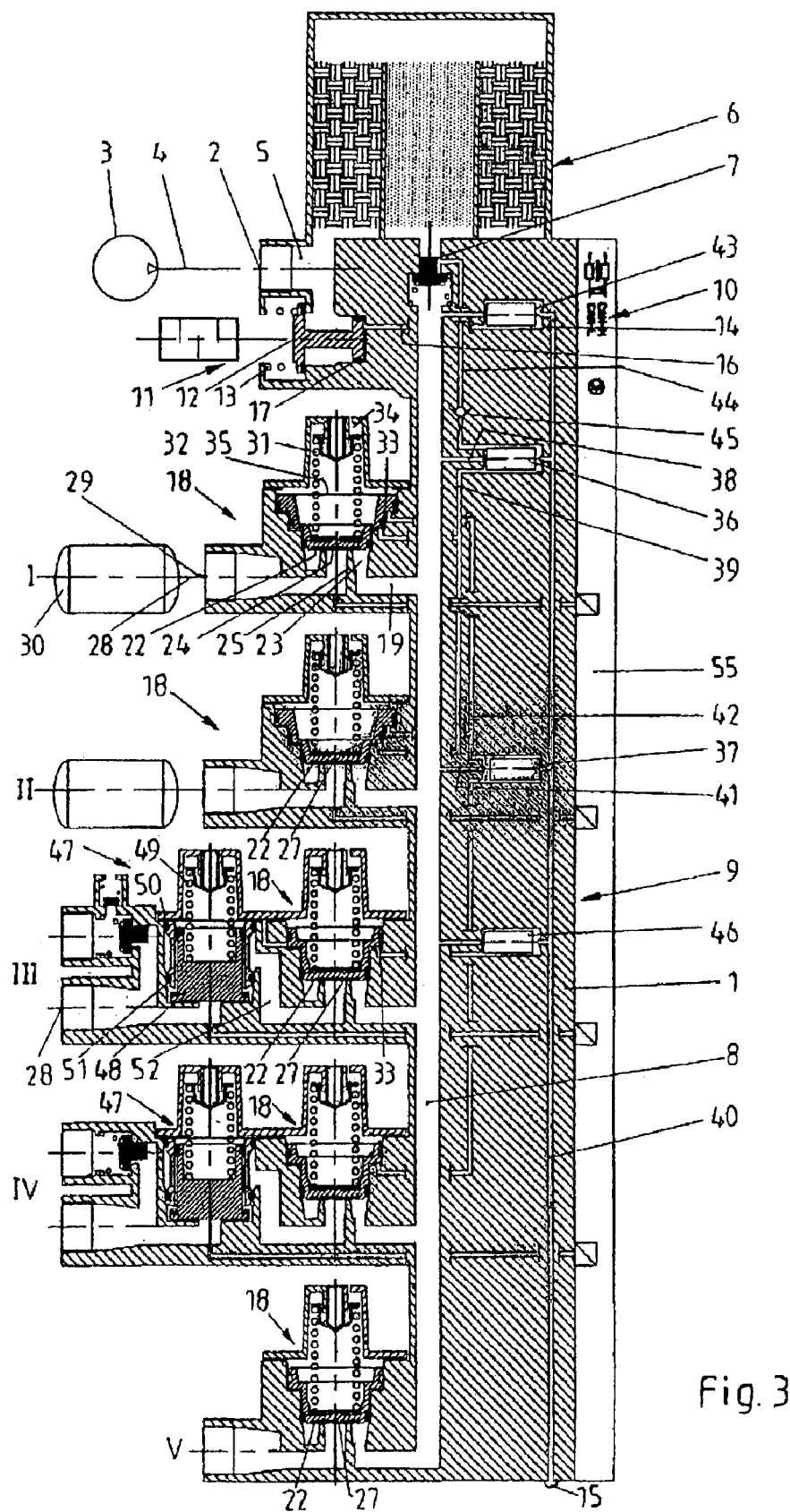
FIG. 3 is a schematic sectional view of a third exemplary embodiment of the novel compressed air control apparatus.

The embodiment of the novel compressed air control apparatus as illustrated in FIG. 3 is similar to the ones described above. The solenoid valve 36 serves to arbitrarily open the overflow valves 18 of the circuits I and II. The solenoid valve 37 serves to arbitrarily close the overflow valves 18 of the circuits I, II and IV. The solenoid valve 46 serves to open the overflow valve 18 of the circuit III. At the same time, the pressure limiting device 47 is subjected. The overflow valves 18 of the circuits I, II and III include the third effective surface 33. The overflow valves 18 of the circuits I, II and IV include the fourth effective surface 35. It is to be seen that the third effective surface 33 and the fourth effective surface 35 are located at the same side of the movable wall 20 and of the step piston 21, respectively, meaning at the upstream side. The solenoid valve 36 serving to open the overflow valve 18 is designed to be closed in its currentless condition. The solenoid valve 37 serving to close the overflow valves 18 of the circuits I, II and IV is designed to be opened in its currentless condition.

When switching the solenoid valve 37, the additional force by the fourth effective surface 35 is eliminated. Thus, the solenoid valve 37 may also be designated as an indirectly operating solenoid valve.

Figure 4:
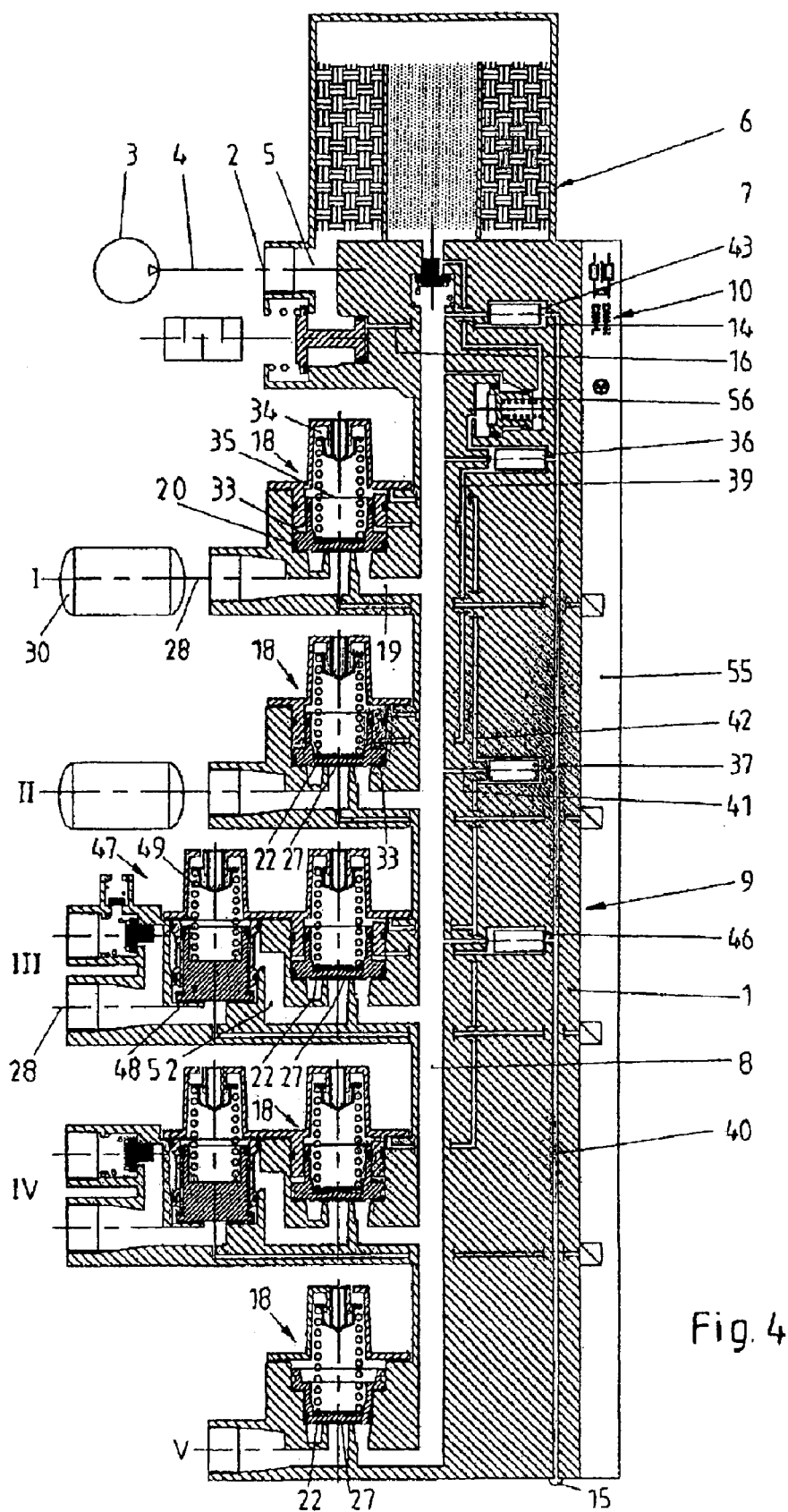
FIG. 4 is a schematic sectional view of a fourth exemplary embodiment of the novel compressed air control apparatus.

In the exemplary embodiment of the novel apparatus according to FIG. 4, the solenoid valve 36 serves to arbitrarily open the overflow valves 18 of the two circuits I and II. The solenoid valve 36 is designed to be opened in its currentless condition. The solenoid valve 37 serves to close the overflow valves 18 of the circuits I to IV. The solenoid valve 37 is designed to be closed in its currentless condition. This means that it locks the connecting conduit, and it allows for deaeration of the respective effective surface 35 in this position. It is to be seen that the effective surfaces 33 and 35 are located at the same side of the movable wall 20, meaning at the side of the rear chamber 34. The solenoid valve 36 also serves to control a regeneration phase by a relay valve 56. This additional function is coordinated with the main function of the solenoid valve 36, meaning the function of opening the overflow valves 18 of the circuits I and II when desired.

Figure 5:
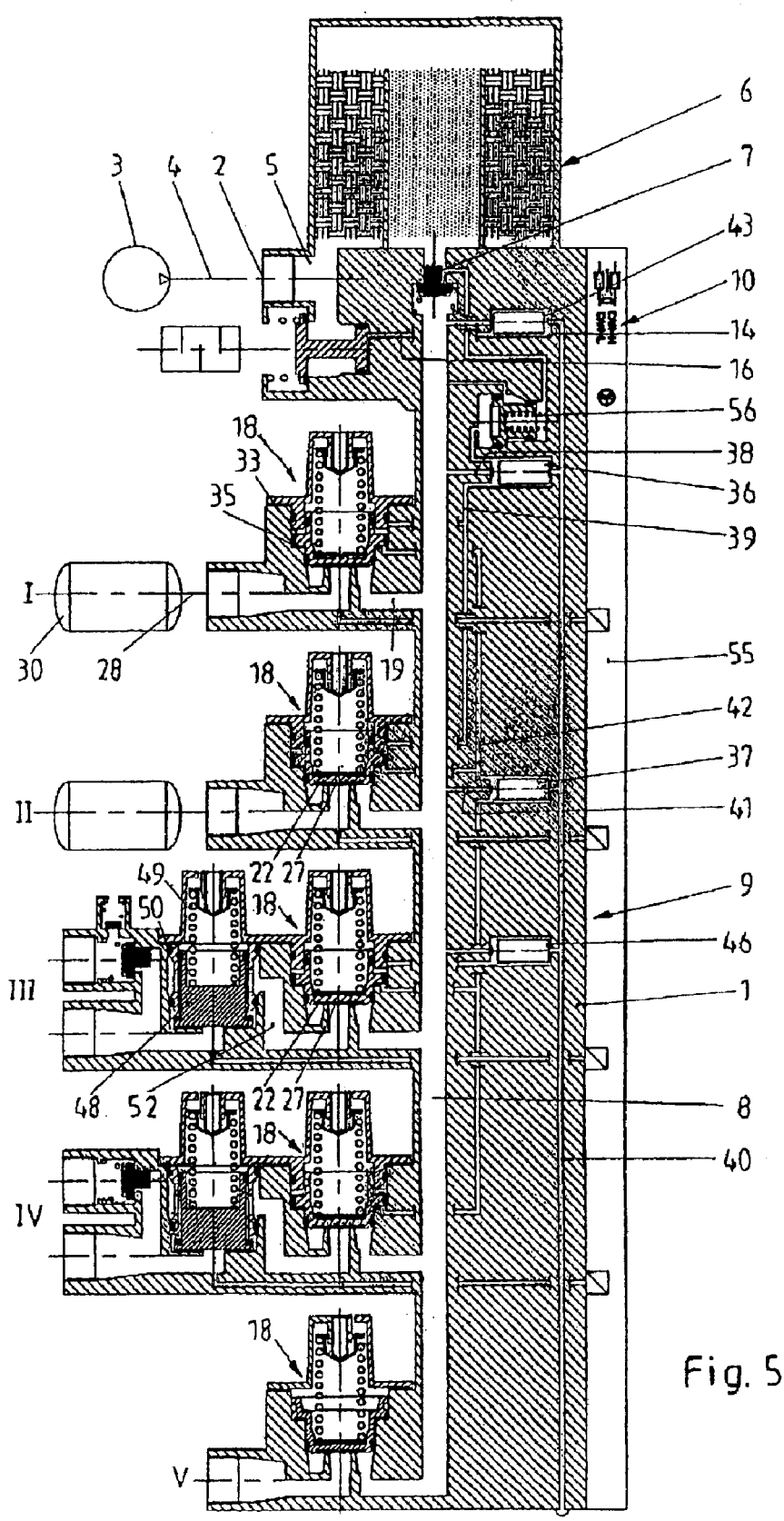
FIG. 5 is a schematic sectional view of a fifth exemplary embodiment of the novel compressed air control apparatus.

The embodiment of the novel compressed air control apparatus as illustrated in FIG. 5 shows another possibility of designing the overflow valves 18 of the circuits I and II. The solenoid valve 37 serves to close the overflow valves 18 of the circuits I to TV. The solenoid valve 46 of FIGS. 1 and 2 serves to open the overflow valve 18 of the circuit III. The effective surfaces 33, 35 are located at different sides of the movable wall 20 of the overflow valves 18. The solenoid valves 36 and 37 are designed to be opened in their currentless condition. It is preferred to control the pressure controller 10 by the solenoid valve 43, the solenoid valve 43 being designed to be closed in its currentless position. It is to be understood that the pressure controller 10 and/or the dryer 6 may be omitted in those embodiments. In such a case, one attains a compressed air distributing apparatus instead of a compressed air control apparatus.

Many variations and modifications may be made to the preferred embodiments of the invention without departing substantially from the spirit and principles of the invention. All such modifications and variations are intended to be included herein within the scope of the present invention, as defined by the following claims.

I claim:

1. A compressed air distributing apparatus for compressed air systems of motor vehicles, comprising:
    a multi circuit protection valve being designed and arranged to supply a plurality of circuits with compressed air, said multi circuit protection valve including:
        a first solenoid valve and a second solenoid valve, each of said solenoid valves including a deaerating connection leading to the atmosphere, and
        a plurality of overflow valves including a valve body, a flow chamber, a rear chamber, a first effective surface, a second effective surface and a spring being located in said rear chamber,
            said valve body being designed and arranged to separate said flow chamber from said rear chamber,
            each of said overflow valves being associated with one of said circuits and being designed and arranged in a way that the opening pressure is greater than the closing pressure to allow for limited backflow,
            at least one of said overflow valves including a third effective surface and a fourth effective surface,
                said third effective surface being designed and arranged to be controlled by said first solenoid valve,
                said fourth effective surface being designed and arranged to be controlled by said second solenoid valve,
                said first solenoid valve being designed and arranged to open said overflow valve,
                said second solenoid valve being designed and arranged to close said overflow valve.

2. The compressed air distributing apparatus of claim 1, wherein said valve body has a first side and an opposite second side, said third effective surface being located at said first side of said valve body and said fourth effective surface being located at said second side of said valve body.

3. The compressed air distributing apparatus of claim 2, wherein said first and second solenoid valves being associated with said third and fourth effective surface are designed to be closed in the currentless condition.

4. The compressed air distributing apparatus of claim 2, wherein said first and second solenoid valves being associated with said third and fourth effective surface are designed to be opened in the currentless condition.

5. The compressed air distributing apparatus of claim 1, wherein said valve body has a first side, said third effective surface and said fourth effective surface being located at said first side of said valve body.

6. The compressed air distributing apparatus of claim 5, wherein said first solenoid valve is designed to be closed in the currentless condition, and said second solenoid valve is designed to be opened in the currentless condition.

7. The compressed air distributing apparatus of claim 1, wherein said first solenoid valve being associated with said third effective surface and said second solenoid valve being associated with said fourth effective surface are designed and arranged to control at least two overflow valves of two circuits.

8. The compressed air distributing apparatus of claim 1, wherein said first solenoid valve being associated with said third effective surface is designed and arranged to control at least two overflow valves of two circuits.

9. The compressed air distributing apparatus of claim 1, wherein said second solenoid valve being associated with said fourth effective surface is designed and arranged to control at least two overflow valves of two circuits.

10. The compressed air distributing apparatus of claim 7, wherein said circuits include circuit I and circuit II, said first solenoid valve being associated with said third effective surface being designed and arranged to control circuit I and said second solenoid valve being associated with said fourth effective surface being designed and arranged to control circuit II.

11. The compressed air distributing apparatus of claim 1, wherein said valve body of said overflow valve is designed as a step piston.

12. The compressed air distributing apparatus of claim 10, wherein said circuits further include circuit III, further comprising a third solenoid valve being designed and arranged to open said overflow valve of circuit III below an adjusted opening pressure.

13. The compressed air distributing apparatus of claim 12, further comprising a pressure limiting device being arranged downstream of at least one of said overflow valves, said pressure limiting device including a piston being supported on a limiting spring in an opening direction and an actuation surface facing said limiting spring, said actuation surface being associated with an actuation chamber, said actuation chamber being connected to said effective chamber of said third effective surface of said overflow valve by a connecting conduit.

14. The compressed air distributing apparatus of claim 1, wherein said circuits include circuit I, circuit II, circuit III and circuit IV, wherein said second solenoid valve being associated with said fourth effective surface is designed and arranged to control said overflow valves of circuits I to IV.

15. The compressed air distributing apparatus of claim 1, further comprising a pressure controller being designed and arranged to control the pressure in said compressed air distributing apparatus and an air dryer being designed and arranged to dry the compressed air flowing through said compressed air distributing apparatus.

16. A compressed air control apparatus for compressed air systems of motor vehicles, comprising:
    a pressure controller being designed and arranged to control the pressure in said compressed air control apparatus;
    an air dryer being designed and arranged to dry the compressed air flowing through said compressed air control apparatus; and
    a multi circuit protection valve being designed and arranged to supply a plurality of circuits with compressed air, said multi circuit protection valve including:
        a first solenoid valve and a second solenoid valve, each of said solenoid valves including a deaerating connection leading to the atmosphere, and
        a plurality of overflow valves including a valve body, a flow chamber, a rear chamber, a first effective surface, a second effective surface and a spring being located in said rear chamber, said valve body being designed and arranged to separate said flow chamber from said rear chamber, each of said overflow valves being associated with one of said circuits and being designed and arranged in a way that the opening pressure is greater than the closing pressure to allow for limited backflow, at least one of said overflow valves including a third effective surface and a fourth effective surface,
- said third effective surface being designed and arranged to be controlled by said first solenoid valve,
- said fourth effective surface being designed and arranged to be controlled by said second solenoid valve,
- said first solenoid valve being designed and arranged to open said overflow valve,
- said second solenoid valve being designed and arranged to close said overflow valve.

17. The compressed air control apparatus of claim 16, wherein said valve body has a first side and an opposite second side, said third effective surface being located at said first side of said valve body and said fourth effective surface being located at said second side of said valve body.

18. The compressed air control apparatus of claim 17, wherein said first and second solenoid valves being associated with said third and fourth effective surface are designed to be closed in the currentless condition.

19. A multi circuit protection valve for compressed air systems of motor vehicles, said multi circuit protection valve being designed and arranged to supply a plurality of circuits with compressed air, said multi circuit protection valve comprising:

a first solenoid valve;

a second solenoid valve, each of said first and second solenoid valves including a deaerating connection leading to the atmosphere; and a plurality of overflow valves each including a valve body, a flow chamber, a rear chamber, a first effective surface, a second effective surface and a spring being located in said rear chamber,
- said valve body being designed and arranged to separate said flow chamber from said rear chamber,
- each of said overflow valves being associated with one of said circuits and being designed and arranged in a way that the opening pressure is greater than the closing pressure to allow for limited backflow,
- at least one of said overflow valves including a third effective surface and a fourth effective surface,
- said third effective surface being designed and arranged to be controlled by said first solenoid valve,
- said fourth effective surface being designed and arranged to be controlled by said second solenoid valve,
- said first solenoid valve being designed and arranged to open said overflow valve,
- said second solenoid valve being designed and arranged to close said overflow valve.

20. The multi circuit protection valve of claim 19, wherein said valve body has a first side and an opposite second side, said third effective surface being located at said first side of said valve body and said fourth effective surface being located at said second side of said valve body.

* * * * *

UNITED STATES PATENT AND TRADEMARK OFFICE
CERTIFICATE OF CORRECTION

PATENT NO. : 6,868,866 B2 Page 1 of 1
DATED : March 22, 2005
INVENTOR(S) : Siegfried Heer It is certified that error appears in the above-identified patent and that said Letters Patent is hereby corrected as shown below:

Title page,
Item [12], United States Patent, should read -- Heer --
Item [75], Inventor, should read -- Siegfried Heer, Wiesloch (DE) --

Signed and Sealed this

Second Day of August, 2005

JON W. DUDAS
*Director of the United States Patent and Trademark Office*